US012446937B2

(12) United States Patent  
Garcia et al.

(10) Patent No.: US 12,446,937 B2  
(45) Date of Patent: Oct. 21, 2025

(54) FIXATION DEVICES AND SURGICAL TECHNIQUES SUCH AS FOR RIB STABILIZATION

(71) Applicant: Zimmer Biomet CMF and Thoracic, LLC, Jacksonville, FL (US)

(72) Inventors: Saddy Rodolfo Garcia, St. Augustine, FL (US); James Fewell, Neptune Beach, FL (US)

(73) Assignee: Zimmer Biomet CMF and Thoracic, LLC, Jacksonville, FL (US)

( * ) Notice: Subject to any disclaimer, the term of this patent is extended or adjusted under 35 U.S.C. 154(b) by 278 days.

(21) Appl. No.: 18/134,957

(22) Filed: Apr. 14, 2023

(65) Prior Publication Data

US 2023/0338071 A1 Oct. 26, 2023

Related U.S. Application Data

(60) Provisional application No. 63/332,980, filed on Apr. 20, 2022.

(51) Int. Cl.
| | |
|---|---|
| *A61B 17/80* | (2006.01) |
| *A61B 17/86* | (2006.01) |
| *A61B 17/88* | (2006.01) |

(52) U.S. Cl.  
CPC ...... *A61B 17/8076* (2013.01); *A61B 17/8009* (2013.01); *A61B 17/808* (2013.01); *A61B 17/86* (2013.01); *A61B 17/8894* (2013.01)

(58) Field of Classification Search  
CPC ............ A61B 17/8009; A61B 17/8076; A61B 17/808; A61B 17/8894  
See application file for complete search history.

(56) References Cited

U.S. PATENT DOCUMENTS

| 8,568,417 B2 | 10/2013 | Petrzelka et al. |
| 9,924,986 B2 | 3/2018 | Petrzelka et al. |

(Continued)

FOREIGN PATENT DOCUMENTS

| EP | 4265207 | 11/2024 |
| WO | 2016130154 | 8/2016 |

OTHER PUBLICATIONS

Petrzelka, Joseph E., et al., "An Articulating Tool for Endoscopic Screw Delivery", Proceedings of the 2010 Design of Medical Devices Conference, DMD2010, (Apr. 13-15, 2010), 8 pgs.

(Continued)

*Primary Examiner* — Si Ming Ku  
(74) *Attorney, Agent, or Firm* — Schwegman Lundberg & Woessner, P.A.

(57) ABSTRACT

A system for surgically repairing a rib of a patient is described. The system can include a first rib bracket, one or more fasteners, a driver and a caddy. The first rib bracket can be configured to be fixedly attached to a first side of the rib that faces a thoracic cavity of the patient. The one or more fasteners can be configured to fixedly attach the first rib bracket to the rib. The driver can have an end effector configured to drive the one or more fasteners into the rib. The caddy can be configured to retain the one or more fasteners and deliver these to a position adjacent the rib. The end effector can engage the one or more fasteners to drive the one or more fasteners from the caddy and into the rib to fixedly attach the first rib bracket to the first side of the rib.

16 Claims, 12 Drawing Sheets

(56) References Cited

U.S. PATENT DOCUMENTS

| | | | |
|---|---|---|---|
| 11,033,306 B2 | 6/2021 | Petrzelka et al. | |
| 2010/0076495 A1* | 3/2010 | Lindemann | A61B 17/7059 |
| | | | 606/283 |
| 2010/0331892 A1 | 12/2010 | Fell et al. | |
| 2019/0142485 A1* | 5/2019 | Garcia | A61B 17/8076 |
| | | | 606/291 |
| 2019/0380755 A1 | 12/2019 | Tsai et al. | |
| 2020/0188001 A1* | 6/2020 | Davison | A61B 17/8875 |
| 2021/0267651 A1* | 9/2021 | Didyk | A61B 17/8085 |

OTHER PUBLICATIONS

"European Application Serial No. 23168557.9, Extended European Search Report mailed Sep. 19, 2023", 9 pgs.

"European Application Serial No. 23168557.9, Response Filed Mar. 21, 2024 to Extended European Search Report mailed Sep. 19, 2023", 41 pgs.

* cited by examiner

FIXATION DEVICES AND SURGICAL TECHNIQUES SUCH AS FOR RIB STABILIZATION

CLAIM OF PRIORITY

This application claims the benefit of U.S. Provisional Patent Application Ser. No. 63/332,980, filed on Apr. 20, 2022, the benefit of priority of which is claimed hereby, and which is incorporated by reference herein in its entirety.

FIELD OF THE DISCLOSURE

The present disclosure relates generally to surgical devices and techniques, and particularly, to stabilization devices and techniques such as to stabilize a rib or other bone of a patient.

BACKGROUND OF THE DISCLOSURE

In various orthopedic surgical procedures, it is necessary to align and secure two severed bone portions in a relatively fixed relationship to each other. For example, it is often necessary to establish such a secured relationship after a bone has been fractured as a result of either trauma caused by accidents, or physician intervention. To ensure that the bone can regenerate in the proper orientation and fuse the fracture, it is important that the bone portions be fixed (stabilized) in the desired position during bone regeneration.

Figure 1:
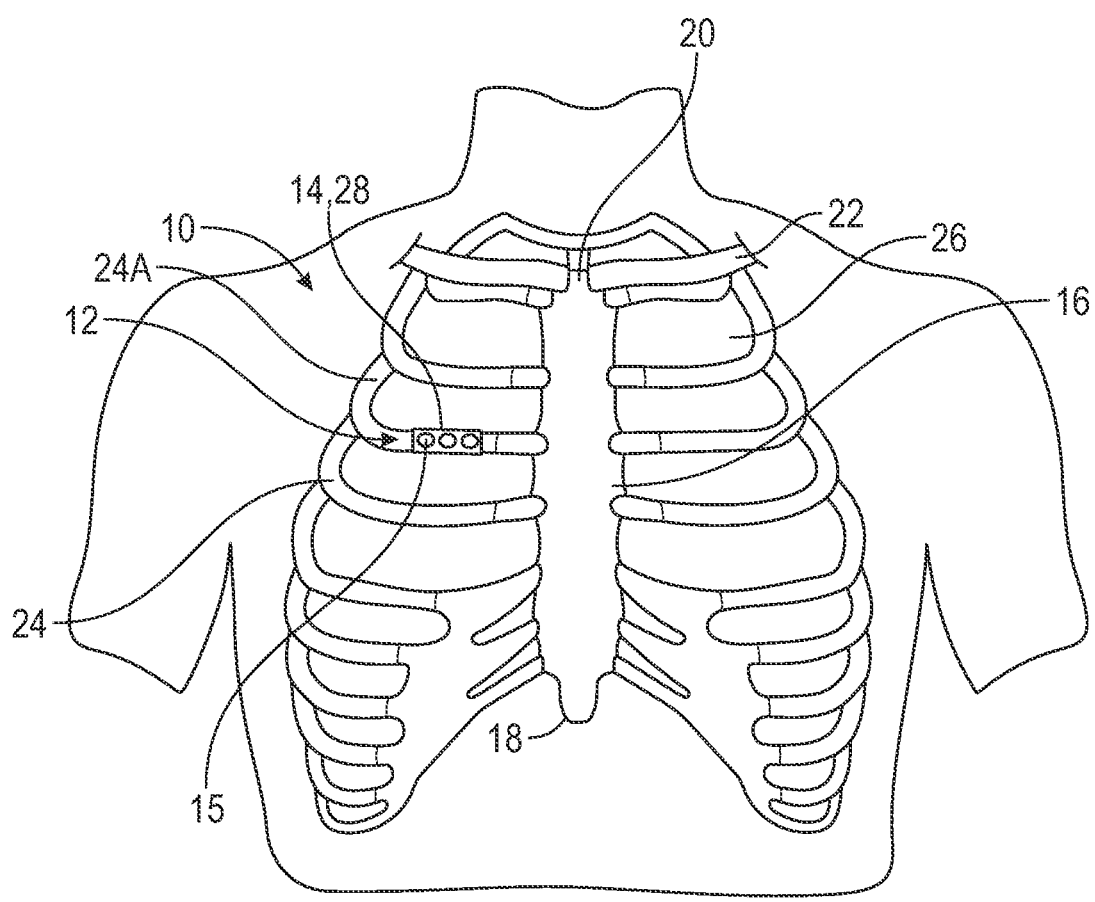
FIG. 1 is a perspective post-operative anterior illustration of a human thorax with a prosthesis installed to stabilize a fracture of a rib according to an example of the present disclosure.

Corresponding reference characters indicate corresponding parts throughout the several views. Elements in the drawings are not necessarily drawn to scale. The configurations shown in the drawings are merely examples, and should not be construed as limiting the scope of the inventive subject matter in any manner.

DETAILED DESCRIPTION

Although the present application discusses prostheses, systems and methods to stabilize a rib fracture or deformity, the present prostheses, systems and methods are also applicable to other bones such as the sternum, xyphoid, clavicle, costal cartilage, or other long bone of the body, for example. The following description is merely exemplary in nature and is in no way intended to limit the teachings, its application, or uses. Thus, it will become apparent to those skilled in the art that certain aspects of the present teachings have applicability to other surgical applications.

The present inventors contemplate benefits from using the disclosed apparatuses, systems and methods. For example, one or more of the brackets disclosed herein can be placed within the thoracic cavity and coupled to an anterior side the rib as part of a minimally invasive procedure (only using a small incision for delivery to the thoracic cavity and prosthesis installation). Thus, the present application recognizes apparatuses and systems for an intrathoracic procedure. Use of a minimally invasive procedure such as the intrathoracic procedure can improve patient recovery time and reduce surgical time. Furthermore, the disclosed apparatuses, systems and methods can reduce or eliminate the need for more invasive extra thoracic procedure where larger incisions are utilized, and cartilage is removed from one or more of the ribs. Extra thoracic rib fracture fixation involves plates and screws to rigidly fixate broken ribs. The procedure consists of making an incision through the soft tissue over the fracture to gain direct access to the rib. The soft tissue is further dissected to accommodate the length and width of the plate implant. The plate implant is then fixated to the rib with screws to stabilize the fracture. As discussed herein, the larger incision and dissection of the cartilage of the extra thoracic procedure can result in longer patient recovery time and increased time for performing the operation as compared with a minimally invasive procedure.

FIG. 1 shows a perspective post-operative anterior view of a human thorax 10 having an assembly 12 implanted therein. The assembly 12 can include at least one prosthesis 14 and one or more fasteners 15. The anterior of the human thorax 10 can be formed by a sternum 16, xyphoid 18, manubrium 20, costal cartilage, and ribs 24. In addition, a clavicle 22 is shown connecting the sternum 16 to the scapula and humerus (neither shown). The human thorax 10 can define a thoracic cavity 26 within the human body under the ribs 24, etc.

One of the ribs 24 (rib 24A) has previously undergone a medical procedure to stabilize a fracture. As a result of the procedure, the assembly 12 has been implanted to stabilize the rib 24A. The prosthesis 14 can comprise a bracket 28 shaped as a plate. The bracket 28 can be configured to be fixedly attached the rib 24A. The one or more fasteners 15 can be configured to fixedly attach the bracket 28 to the rib 24A. The construction of the bracket 28 will be discussed and shown in further detail subsequently. The bracket 28 can be mounted to the rib 24A by the one or more fasteners 15. As shown in FIG. 1, the bracket 28 and the fasteners 15 have stabilized the fracture of the rib 24A.

Examples of the one or more fasteners 15 can include medical-grade screws, medical-grade nails, medical-grade staples, medical-grade posts, and others. According to some examples, the bracket 28 and/or one or more fasteners 15 can be made of a variety of bio-resorbable materials. One resorbable material of particular interest is marketed by Zimmer Biomet, Inc. (Warsaw, Indiana) under the tradename LACTOSORB®. LACTOSORB® is an absorbable co-polymer synthesized from all-natural ingredients: 82% L-lactic acid and 18% glycolic acid, and is substantially amorphous (i.e., without crystallinity), meaning that its degradation is uniform, precluding the crystalline release associated with degrading copolymers that have been associated with late inflammatory reactions. Furthermore, the LACTOSORB® copolymer ratio permits the polymer to retain most of its strength for six to eight weeks. Such a time period is appropriate for healing, but not so long as to raise concerns about long-term stress shielding of bone. In addition to LACTOSORB®, other resorbable materials may be used such as PLA, PGA, and others including various polymers, ceramics, etc.

The bracket 28 and/or one or more fasteners 15 may also be made from a variety of bio-compatible materials. These materials may not be resorbable. Examples of bio-compatible materials that may be used are the implantable plastics PEEK or PET. In addition to PEEK or PET, implantable surgical metals may also be used. Alloys that may be implanted are, but not limited to, stainless steel, titanium, or cobalt chrome molybdenum. Specifically, commercially pure titanium, listed as grade 1, 2, 3, or 4 or titanium alloy such as titanium 6-aluminum/4-vanadium may be used. The bracket 28 may be inelastically deformable so as to retain its shape once contoured to cooperate with the shape of the bone regions to be secured.

Figure 2A:
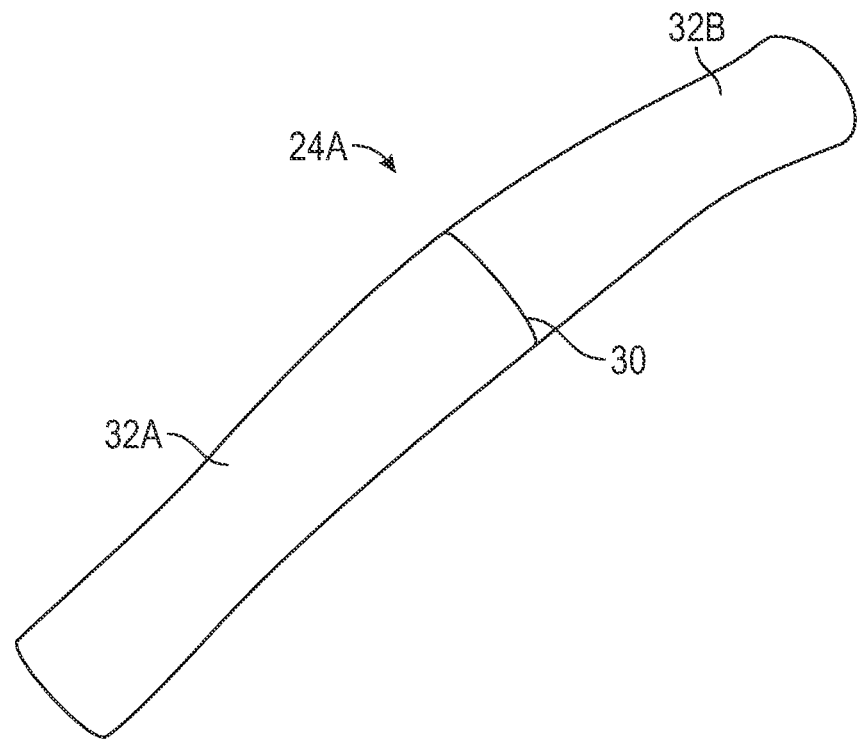
FIG. 2A is an isolation view of the fracture to a rib prior to installation of the prosthesis (such as the prosthesis of FIG. 1) according to an example of the present application.

FIG. 2A shows a prospective view of the rib 24A with the fracture 30 in isolation prior to implantation of the assembly 12 of FIG. 1. A surgeon optionally has placed indicia on the rib 24A indicating desired locations for the one or more fasteners 15 (FIG. 1). The rib 24A has portions 32A and 32B, which have been aligned by the surgeon to reduce the fracture 30.

Figure 2B:
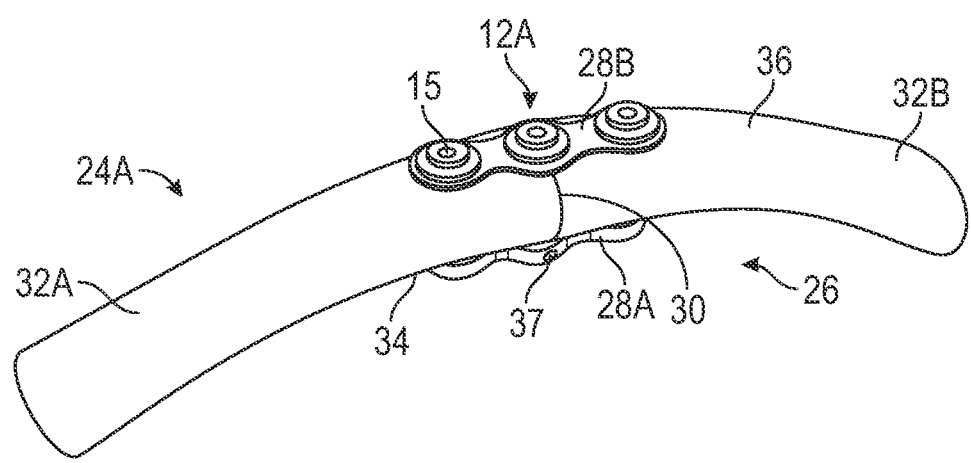
FIG. 2B is the rib of FIG. 2A with the fracture stabilized by an assembly of two prostheses and one or more fasteners according to an example of the present application.

FIG. 2B shows a perspective view of the rib 24A stabilized with an assembly 12A. The assembly 12A of FIG. 2B includes a first bracket 28A, a second bracket 28B and the one or more fasteners 15. As shown in FIG. 2B, the first bracket 28A can interface with and be mounted to a first side 34 of the rib 24A. This first side 34 can be an anterior side of the rib 24A that interfaces with the thoracic cavity 26 of the patient. The first bracket 28A can be configured to be fixedly attached to the first side 34 of the rib 24A that faces the thoracic cavity 26 of the patient. The one or more fasteners 15 can be configured to fixedly attach the first bracket 28A to the rib 24A.

The second bracket 28B can interface with and be mounted to a second side 36 of the rib 24A. The second side 36 of the rib 24A can be a posterior side (an external or outward facing side) of the rib 24A. The second bracket 28B can be configured to be fixedly attached to the second side 36 of the rib 24A. The one or more fasteners 15 can be configured to fixedly attach the second bracket 28B to the rib 24A. The first bracket 28A and second bracket 28B can be generally aligned on opposing sides of the rib 24A so as to form a sandwich of the rib 24A. The bracket 28A and second bracket 28B can span the facture 30 so as to anchored by the one or more fasteners 15 to both the bone portion 32A and the bone portion 32B.

Figure 3A:
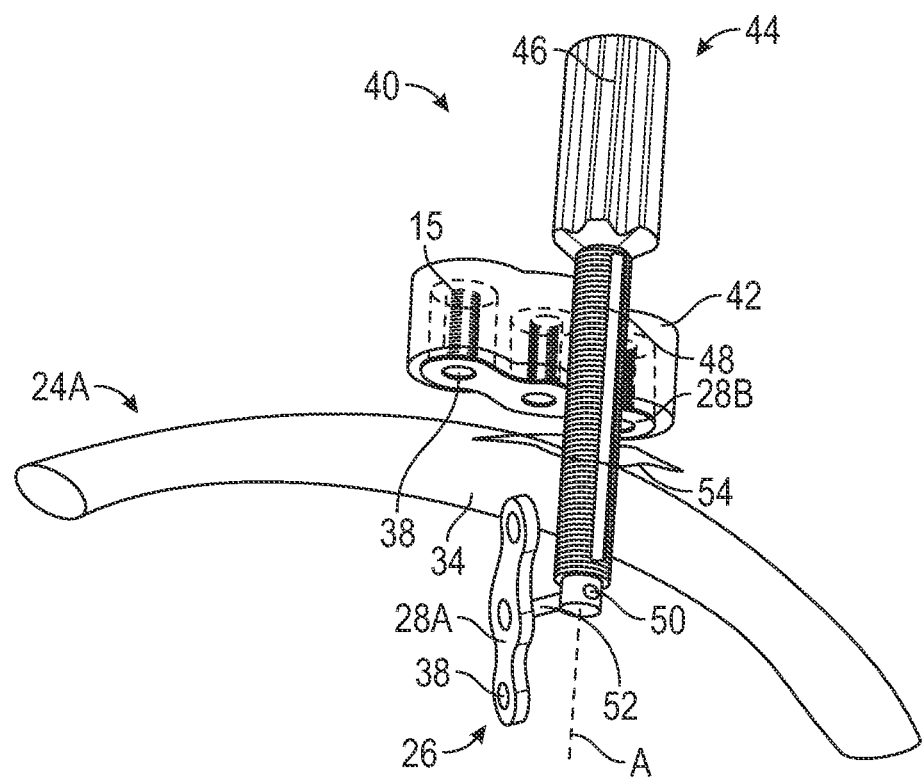
FIGS. 3A-3D show various steps in a delivery process of a system for forming the assembly of the two prostheses and one or more fasteners of FIG. 2B according to an example of the present application.
Figure 3B:
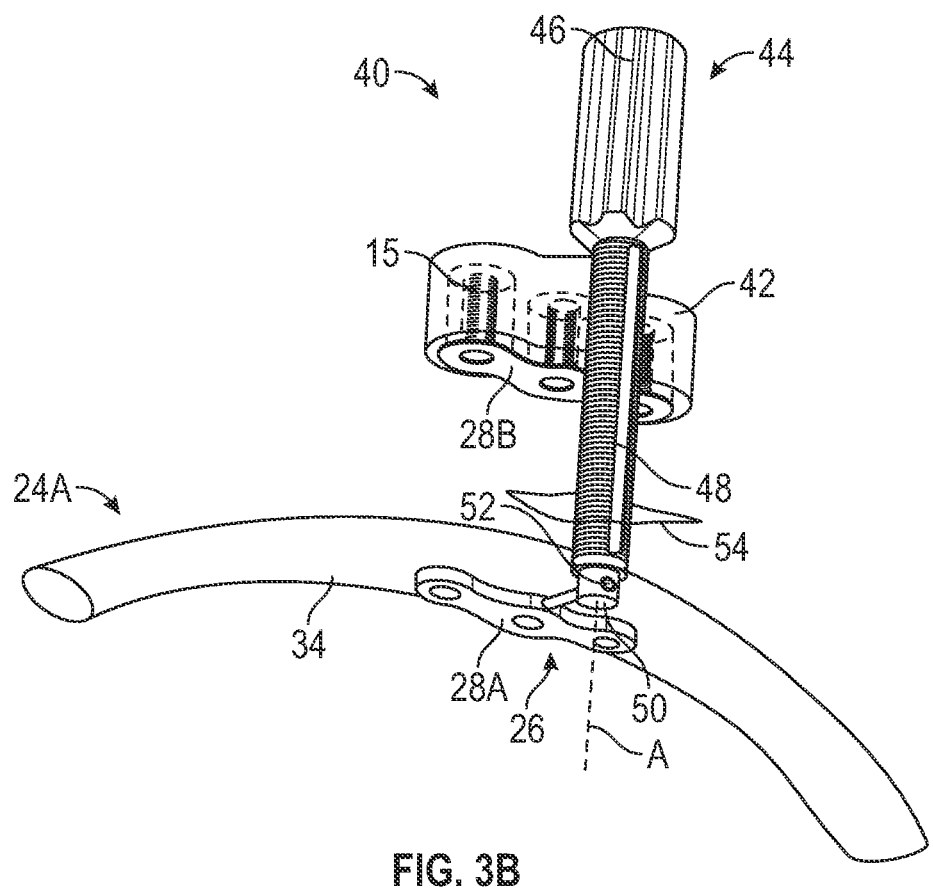

The first bracket 28A and second bracket 28B can be similarly constructed or can have a different construction from one another. The first bracket 28A can have an aperture 37 configured to receive a pivot pin of a delivery device as further discussed in reference to FIGS. 3A-3D. Referring now to FIGS. 3A and 3B, the first bracket 28A can be thinner, equal, or thicker than the second bracket 28B. Both the first bracket 28A and second bracket 28B can include one or more apertures 38. The one or more apertures 38 can be shaped and sized to receive the head or other portions the one or more fasteners 15 (FIG. 2B). The first bracket 28A and second bracket 28B can have an elongate length with the length much longer relative to the width and thickness dimensions. The one or more apertures 38 may be threaded or simply formed as non-threaded through holes. The one or more apertures 38 may be positioned symmetrically having bridge regions of the brackets 28A, 28B therebetween or may be arranged asymmetrically. Further, one or more apertures 38 may optionally include a circular or an oval countersink and may be internally threaded according to some examples. As shown in FIGS. 2A and 2B, one of the one or more apertures (and consequently one of the one or more fasteners 15) can be aligned with the fracture 30 while others of the apertures and the fasteners 15 can be positioned to align with the bone portion 32A and the bone portion 32B.

FIGS. 3A-3D show a system 40 according to an example of the present disclosure. The system 40 can include the one or more fasteners 15, first bracket 28A (not shown in FIG. 3C), and the second bracket 28B as previously discussed but can further include a caddy 42 and a delivery device 44. The delivery device 44 can include an actuator 46, a shaft 48, a tip 50 and a pivot pin 52.

Figure 3C:
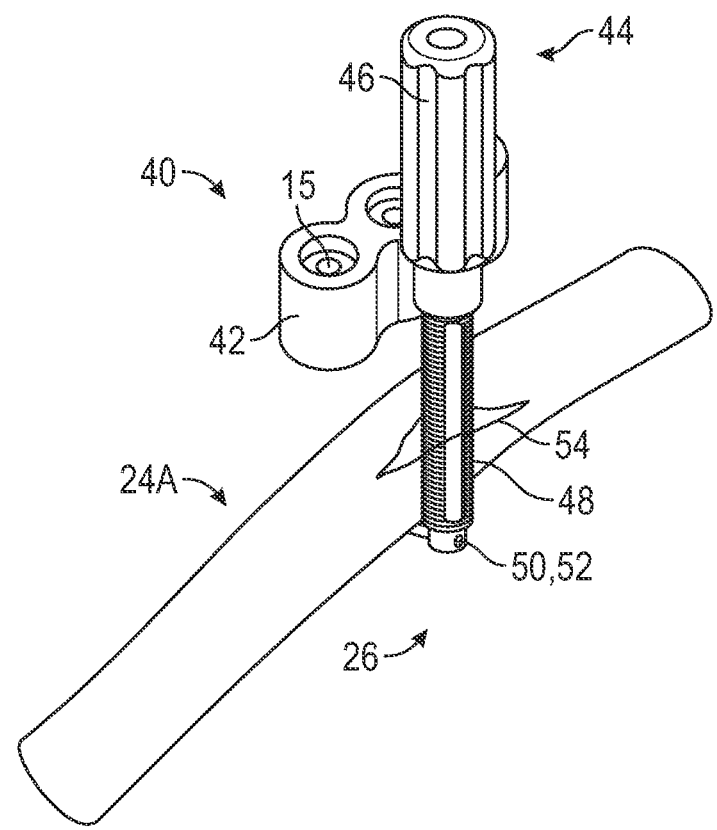
Figure 3D:
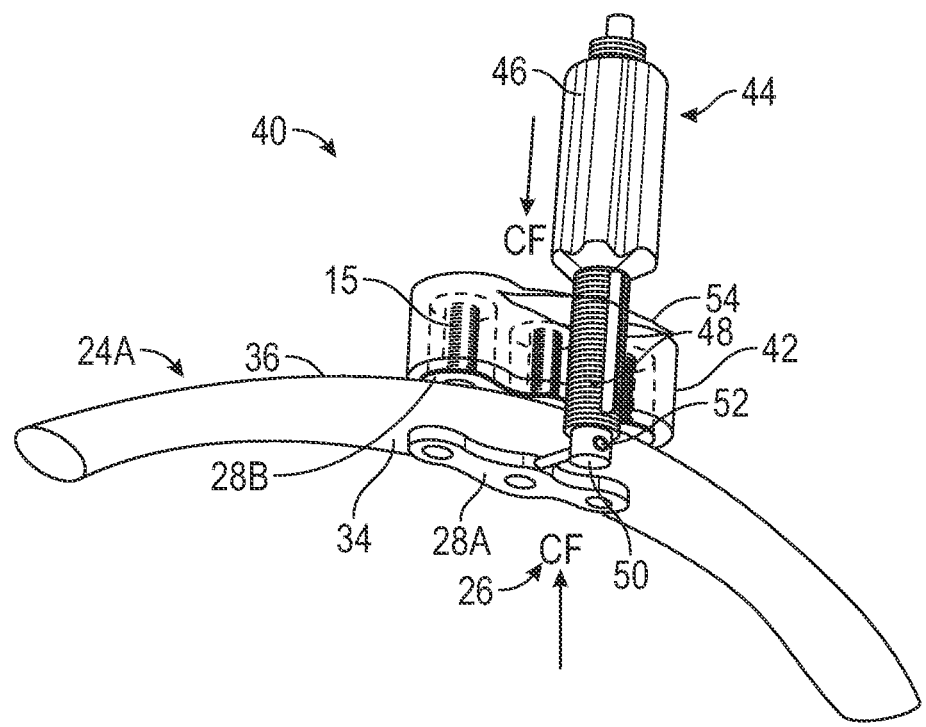

The caddy 42 can have one or more recesses configured to receive and retain the one or more fasteners 15 for delivery to adjacent the rib 24A by the delivery device 44 as shown in FIGS. 3A-3D. The second bracket 28B can be coupled to the caddy 42 such as on a bottom side so as to be placed to interface with the rib 24A as shown in FIG. 3D.

As shown in FIG. 3A, the first bracket 28A can be selectively coupled to the delivery device 44 by the pivot pin 52 at the tip 50, which is received in the aperture 37 (FIG. 2B) of the first bracket 28A. The first bracket 28A can be detachable from the pivot pin 52 once assembly 12A is created by driving the fasteners 15 into the rib 24A to fixate the first bracket 28A to the bone.

FIGS. 3A and 3B show the first bracket 28A can be configured to rotate on the pivot pin 52 from a first position (shown in FIG. 3A) to a second position (shown in FIG. 3B). More particularly, the first bracket 28A can be configured to pass through an incision 54 in the patient in the first position as shown in FIG. 3A. This first position can be at vertical or near vertical (within 15 degree of vertical) relative to the incision 54. Put another way, the first position can align or substantially align the elongate length of the first bracket 28A with an axis A of the shaft 48 as shown in FIG. 3A. The first position can minimize or reduce the size of the incision 54 as the elongate length of the first bracket 28A is in the vertical or near vertical position and is thus minimized. In the first position, the first bracket 28A can pass into the thoracic cavity 26 as shown in FIG. 3A.

As shown in FIG. 3B, upon contacting the first side 34 of the rib 24A, the first bracket 28A can be configured to pivot relative to the shaft 48 on the pivot pin 52 of the delivery device 44 within the thoracic cavity 26 to the second position. In the second position, the first bracket 28A can interface with the first side 34 of the rib 24A along a Major surface thereof such that the one or more apertures 40 are in position to receive the one or more fasteners 15. Pivoting to the second position can be facilitated by a shape of an outer edge of an end of the first bracket 28A, which can be filleted, chamfered, rounded or the like.

The caddy 42 can be configured to retain the one or more fasteners 15 and deliver the one or more fasteners 15 to a position adjacent the rib as shown in FIG. 3D. Once in the position of FIG. 3D, an end effector (example shown subsequently) can be configured to engage the one or more fasteners 15 to drive the one or more fasteners 15 from the caddy 42 and into the rib 24A to fixedly attach the first bracket 24A to the first side 34 of the rib 24A and the second bracket 24B to the second side 36 of the rib 24.

FIGS. 3A-3D also show the caddy 42 moveably coupled to the delivery device 44. The caddy 42 can translate along the shaft 48 of the delivery device 44 as facilitated by the actuator 46. In particular, the actuator 46 can be rotated on threading along the shaft 48 distally from the position of FIGS. 3A-3C to the position of FIG. 3D to engage the second bracket 28B to the second side 36 of the rib 24A. The actuator 46 can force the caddy 42 coupled to the second bracket 28B to translate along a groove or other feature in the shaft 48. Upon reaching the position of FIG. 3D with the second bracket 28B engaging the rib 24A, the delivery device 44 via the caddy 42 and the second bracket 28B can apply a force on second side 36 of the rib 24A. Additionally, the delivery device 44 can configured to engage the second bracket 28B against the second side 36 of the rib 24A while the first bracket 28A is engaged by the delivery device 44 with the first side 34 of the rib 24A. This arrangement can apply a clamp force CF on the rib 24A as shown in FIG. 3D. The second bracket 28B can then be configured to be fixedly attached to the second side 36 of the rib 24A. The one or more fasteners 15 can then be driven from the caddy 42. Reviewing FIG. 2B, the one or more fasteners 15 can pass from the caddy 42 (not shown in FIG. 2B) and can be driven at least partially through the one or more apertures 40 of the second bracket 28B into the rib 24A. The one or more fasteners 15 can pass through the rib 24A and can be received in one or more apertures 40 of the first bracket 28A. The one or more fasteners 15 can mount the first bracket 28A and the second bracket 28B together against the rib 24A and hold together the assembly 12A. Upon forming the assembly 12A, the delivery device 44 can be decoupled from the first bracket 28A and can be removed from the thoracic cavity 26.

Figure 4:
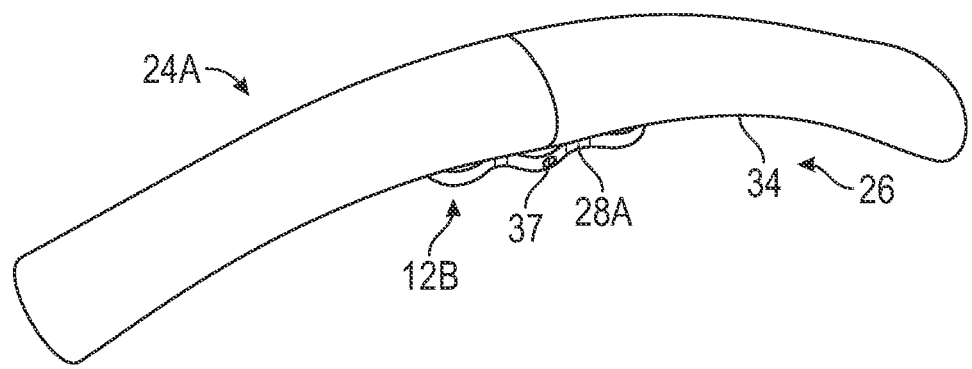
FIG. 4 is the rib of FIG. 2A with the fracture stabilized by an assembly of a single intrathoracically placed prosthesis and one or more fasteners according to an example of the present application.
Figure 5A:
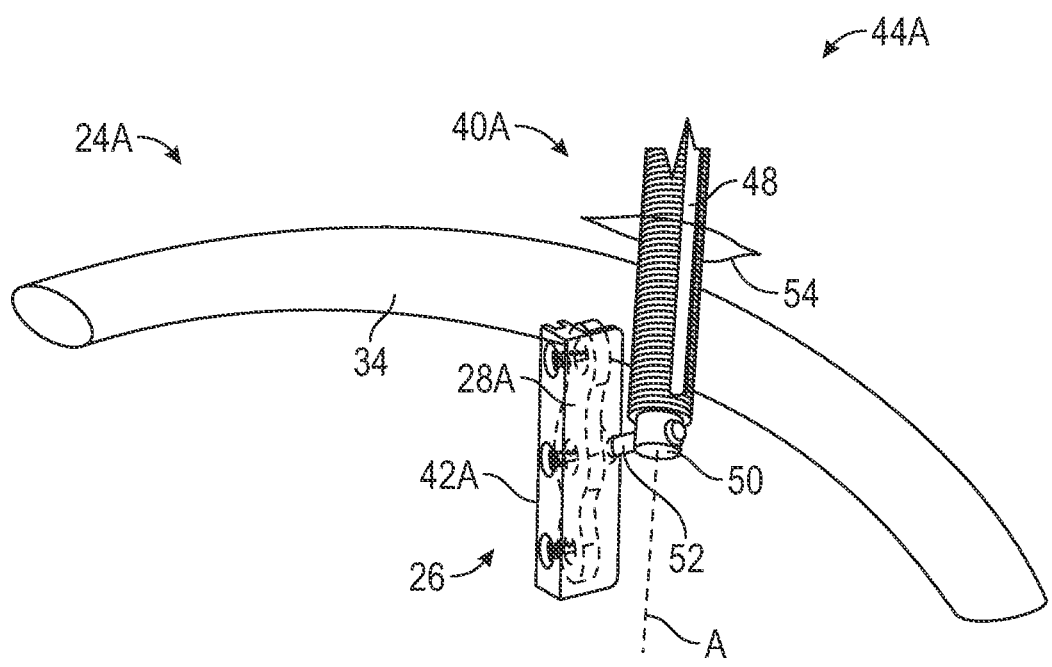
FIGS. 5A-5D show various steps in a delivery process of a system for forming the assembly of the prosthesis and one or more fasteners of FIG. 4 according to an example of the present application.
Figure 5B:
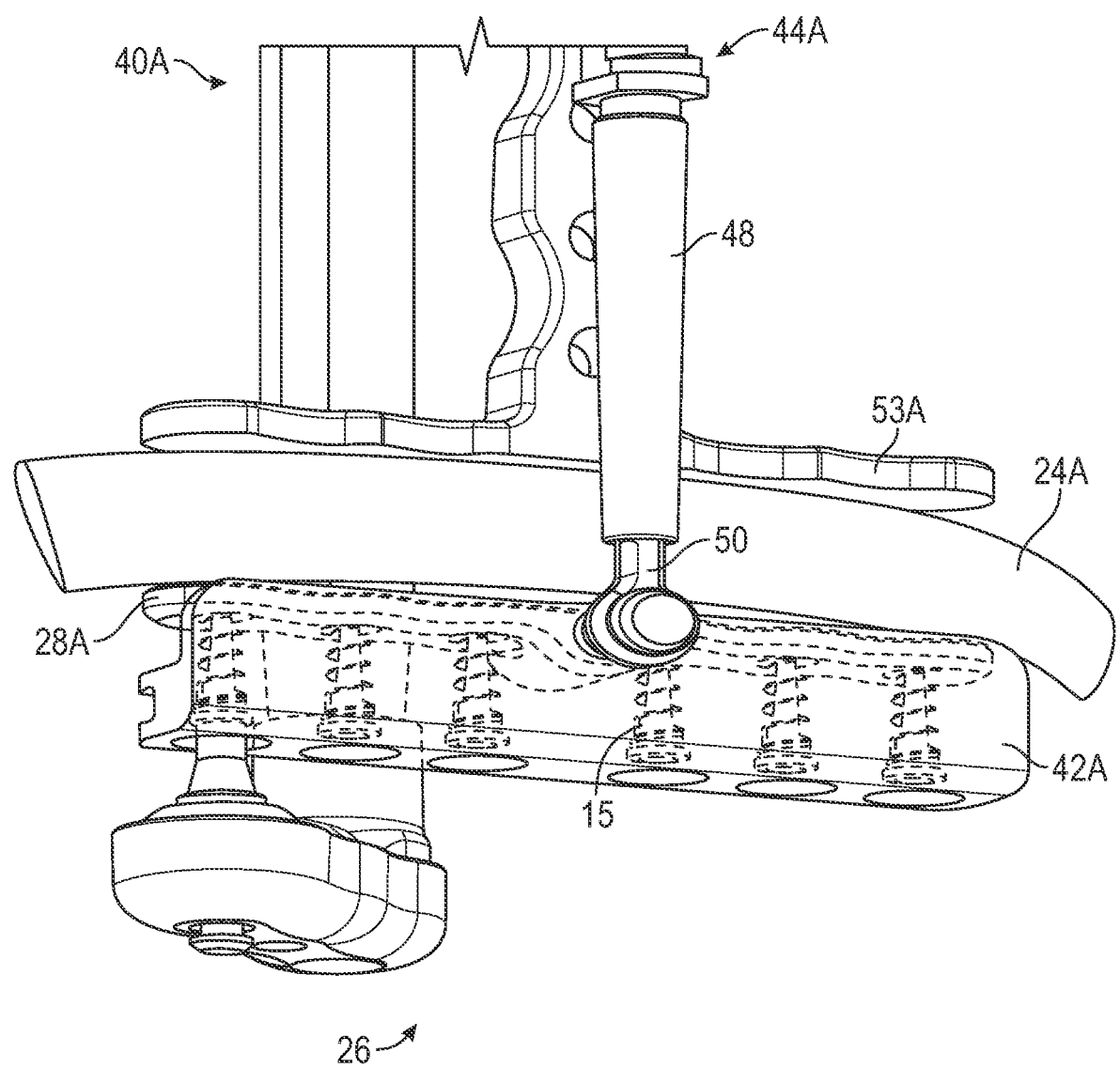
Figure 5C:
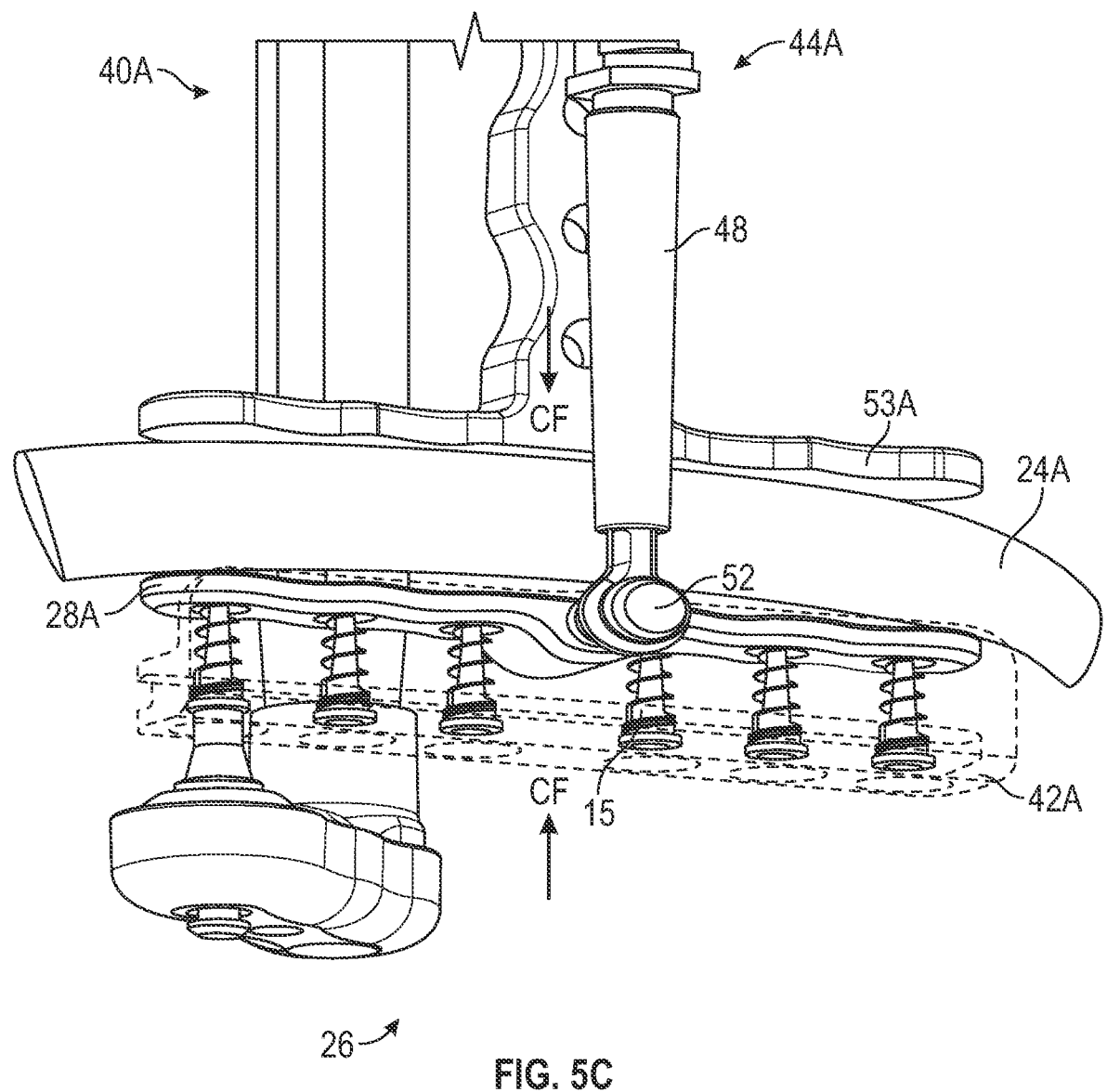

FIG. 4 shows a perspective view of the rib 24A stabilized with an assembly 12B. The assembly 12B of FIG. 4 may be more desirably than the assembly 12A of FIG. 2B in certain situations where a minimally invasive procedure with only a relatively small incision is desirable. To help facilitate placement of the assembly 12B, the lungs can be partially deflated and scopes (not shown) are used through an incision (access port) to navigate and place components such as the first bracket 28A. The assembly 12B includes the first bracket 28A and the one or more fasteners 15 (FIGS. 5A-5C). Thus, the assembly 12B differs from the assembly 12A. in that the assembly 12B includes only a single bracket (first bracket 28A). As shown in FIG. 4, the first bracket 28A can interface with and be mounted to the first side 34 of the rib 24A. This first side 34 can interface with the thoracic cavity 26 of the patient. The first bracket 28A can be configured to be fixedly attached to the first side 34 of the rib 24A that faces the thoracic cavity 26 of the patient. The one or more fasteners 15 can be configured to fixedly attach the first bracket 28A to the rib 24A.

The first bracket 28A can be constructed in the manner previously described including in regards to bracket 28. The first bracket 28A can be delivered to the first side 34 of the rib 24A in a manner as previously described in FIGS. 3A-3D. However, some differences from the technique of FIGS. 3A-3D in the delivery of the first bracket 28A and fixation of the first bracket 28A to the rib 24A are noted in the following passages and are shown in FIGS. 5A-5D.

FIGS. 5A-5D show a system 40A according to an example of the present disclosure. The system 40A can include the one or more fasteners 15 and the first bracket 28A, as previously discussed but can further include a caddy 42A and a delivery device 44A. The delivery device 44A can include the actuator 46 (only shown in FIG. 5D), the shaft 48, the tip 50 and the pivot pin 52 in the manner previously described for the delivery device 44. However, the delivery device 44A can additionally include a member 53A (FIGS. 5B-5D) not utilized with the previously described delivery device.

FIG. 5A shows the first bracket 28A can be selectively coupled to the delivery device 44A by the pivot pin 52, which is received in the aperture 37 of FIGS. 2B and 4. The first bracket 28A can be detachable from the pivot pin 52 once assembly 12B is created. However, the arrangement of FIG. 5A differs from that of FIG. 3A in that the caddy 42A is additionally coupled to the pivot pin 52 at the tip 50. The caddy 42A is pivotably mounted on the pivot pin 52 as further discussed herein. FIGS. 5A and 5B show the first bracket 28A and the caddy 42A can be configured to rotate on the pivot pin 52 from a first position (shown in FIG. 5A) to a second position (shown in FIG. 5B). More particularly, the first bracket 28A and the caddy 42A can be configured to pass through the incision 54 in the patient in the first position as shown in FIG. 5A. This first position can be at vertical or near vertical (within 15 degree of vertical) relative to the incision 54. Put another way, the first position can align or substantially align the elongate length of the first bracket 28A and the caddy 42A with an axis A of the shaft 48 as shown in FIG. 5A. The first position can minimize or reduce the size of the incision 54 as the elongate length (largest dimension) of the first bracket 28A and the caddy 42A is in the vertical or near vertical position. In the first position, the first bracket 28A and the caddy 42A can pass into the thoracic cavity 26 as shown in FIG. 5A.

As shown in FIGS. 5B and 5C, upon contacting the first side 34 of the rib 24A, the first bracket 28A and the caddy 42A can be configured to pivot relative to the shaft 48 on the pivot pin 52 of the delivery device 44A within the thoracic cavity 26 to the second position. In the second position, the first bracket 28A can interface with the first side 34 of the rib 24A along a major surface thereof such that the one or more apertures 40 are in position to receive the one or more fasteners 15.

The caddy 42A can be configured to retain the one or more fasteners 15 and deliver the one or more fasteners 15 to a position adjacent the first bracket 28A and the rib 24A as shown in FIGS. 5B and 5C. Once in the position of FIGS. 5B and 5C, an end effector (example shown subsequently in FIGS. 6A and 6B) can be configured to engage the one or more fasteners 15 to drive the one or more fasteners 15 from the caddy 42A partially through the first bracket 28A and into the rib 24A to fixedly attach the first bracket 24A to the first side 34 of the rib 24A.

Figure 5D:
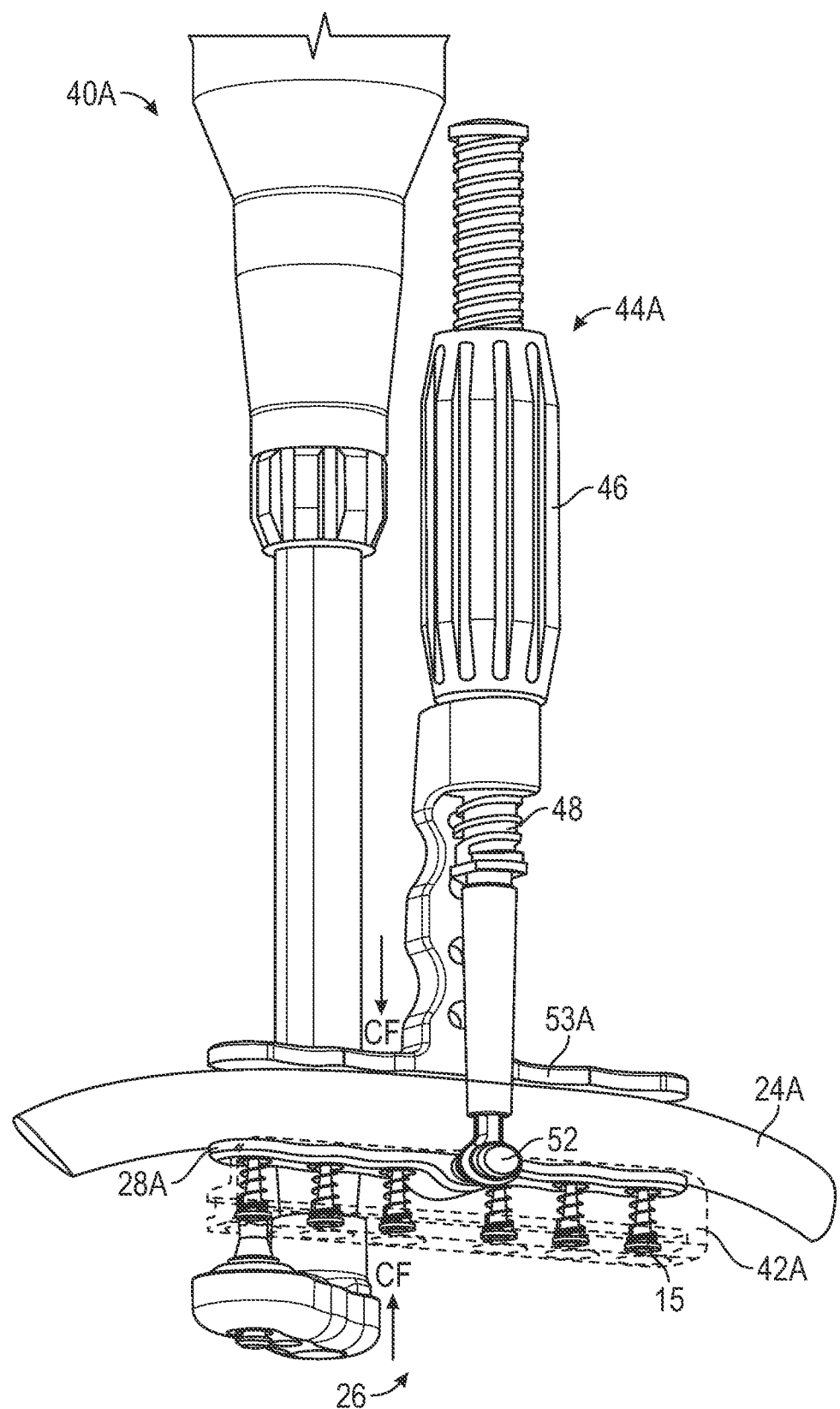

FIG. 5D shows the member 53A moveably coupled to the delivery device 44. The member 53A can translate or otherwise move along the shaft 48 of the delivery device 44A as facilitated by the actuator 46. In particular, the actuator 46 can be rotated on threading along the shaft 48 distally to the position of FIGS. 5B-5D to engage the first bracket 28A to the first side 34 of the rib 24A. The actuator 46 can force the member 53A to engage the rib 24A along the second side 36 and can apply a force on the second side 36 of the rib 24A. Additionally, the delivery device 44 can configured to engage the first bracket 28A against the first side 34 of the rib 24A while the member 53A is engaged by the delivery device 44A with the second side 36 of the rib 24A. This arrangement can apply a clamp force CF on the rib 24A as shown in FIG. 5D.

Figure 6A:
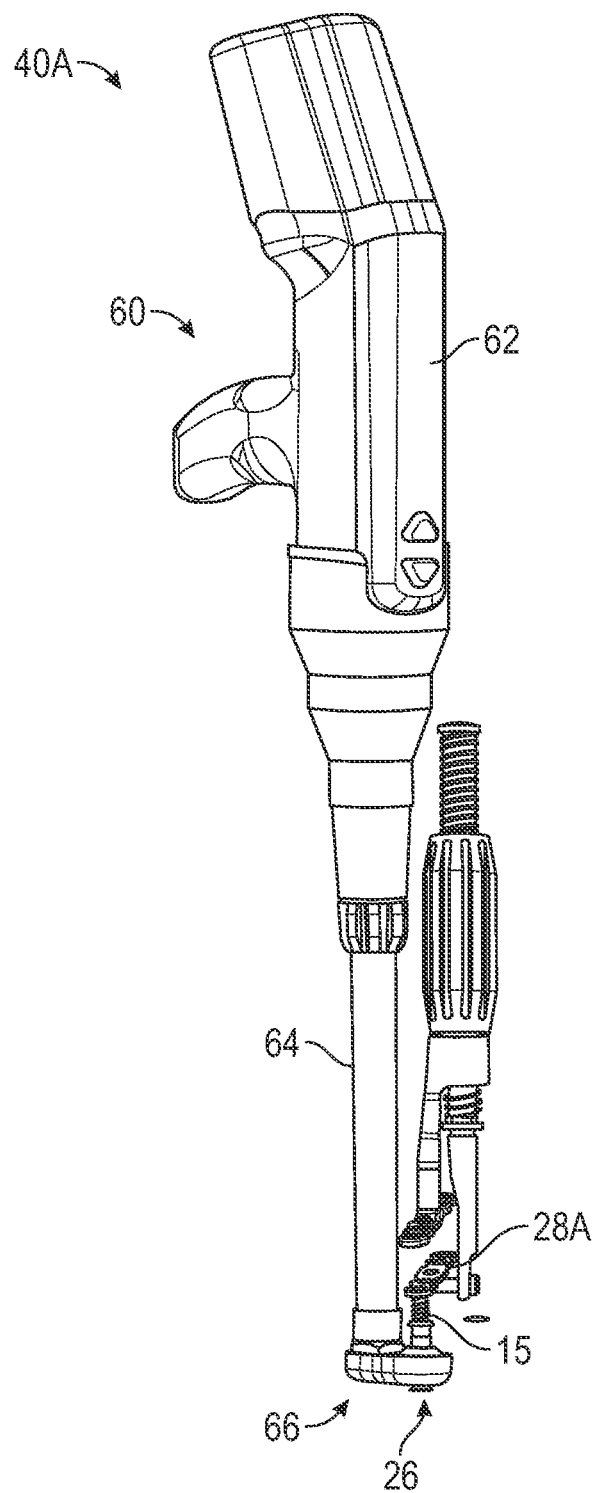
FIG. 6A shows instruments that can be used with systems discussed herein including a driver and a delivery tool for installation of the prosthesis and one or more fasteners used for the assembly of FIG. 2B or FIG. 4 according to an example of the present application.
Figure 6B:
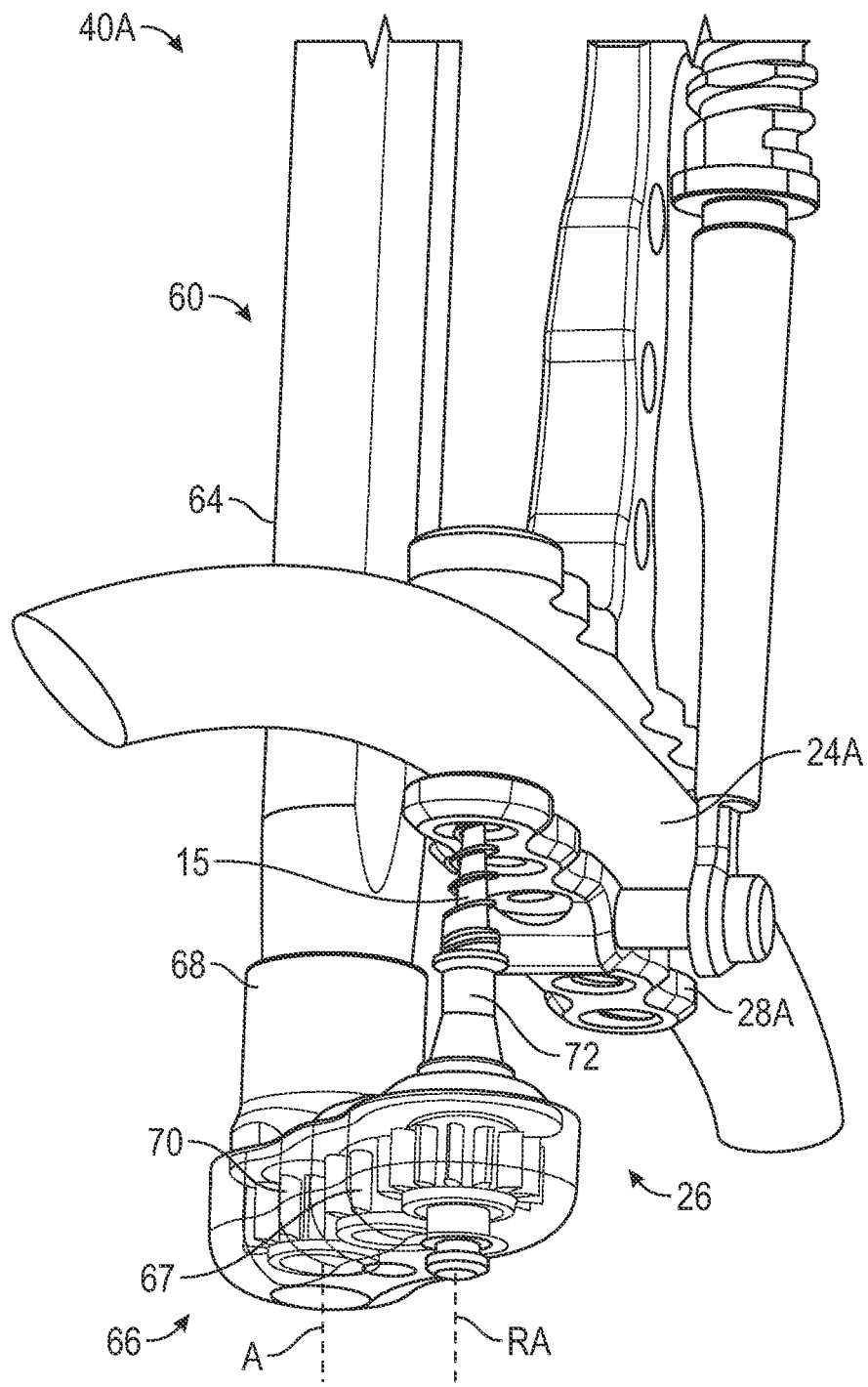
FIG. 6B is an enlarged view of distal ends of the driver and delivery tool of FIG. 6A showing driving of one of the fasteners into the prosthesis and retraction of a pivot pin from the prothesis to decouple the delivery device from the prosthesis according to an example of the present application.

Turning to FIGS. 6A and 6B, the system 40A is further expanded to include additional components. The first bracket 28A can be configured to be fixedly attached to the first side 34 of the rib 24A (FIGS. 3A-3C). Fixation can be performed with the driver 60 driving the one or more fasteners 15 such as shown in FIGS. 6A and 6B. The driver 60 can include a body 62 (FIG. 6A), a shaft 64 and an end effector 66. As shown in FIG. 6B, the end effector 66 can include a shaft coupling portion 68, a body 70 and a drive head 72.

In FIG. 6A, the body 62 can be configured for gripping and actuation of a motor or other motive device by the surgeon. The body 62 can be coupled to the shaft 64. The shaft 64 can extend distally from the body 62 to the end effector 66. The shaft 64 can include internal components (e.g., an internal shaft acting as a driver not shown) configured to rotate or otherwise move to drive the drive head 72 to rotate or otherwise actuate the end effector 66 as a driver. The shaft 64 can be part of an existing drive tool with the end effector 66 specifically configured for the deployment below the rib(s) as discussed and illustrated herein.

As shown in FIG. 6B, the end effector 66 can have a fixed pre-defined shape, and thus, is not extendible, retractable or otherwise configured to change in shape or extent. The shape of the end effector 66 can be U-shape. The U-shape arrangement of the end effector 66 can allow the end effector 66 to pass through a small incision yet be able to be moved under the rib (or other bone for deployment). The end effector 66 can be manipulated in position via manipulation (e.g., rotational turning) of the shaft 64. Thus, the end effector 66 may not be manipulatable independently of the shaft 64 for repositioning according to some examples.

The shaft coupling portion 68 can be configured to couple with the shaft 64. This coupling can be via receptacle, interlocking male/female or other connection as known in the art. The body 70 of the end effector 66 can extend substantially laterally from the shaft coupling portion 68 and shaft 64 such that the driver head 72 is offset from an axis A of the shaft 64. The shape of the end effector 66 is that of a U from the shaft coupling portion 68 along the body 70 to the drive head 72. Driver head 72 can be pointed back in a general direction proximally toward the body 62 of the driver 60. Put another way, the driver head 72 can have a rotational axis RA that is substantially aligned (up to within 15 degrees of alignment or exactly aligned) with but offset from the axis A of the shaft 64. The driver head 72 can extend from the body 70 back in a direction proximally substantially parallel (up to within 15 degrees of parallel or exactly parallel) with and along the axis A of the shaft 64.

As best shown in FIG. 6B, the end effector 66 can be configured to drive the one or more fasteners 15 into the rib 24A. To do so, the end effector 66 can utilize a plurality of spur gears 67 as shown in FIG. 6B. The plurality of spur gears 67 can be used to maintain correct rotation output when used with existing drivers. The embodiment disclosed here has three spur gears meshed together although different numbers of spur gears are contemplated. When a forward drive button is active, the fastener 16 is rotated in the forward direction. A reverse drive button can also be utilized to reverse the one or more fasteners if needed. In particular, the one or more fasteners 15 can then be driven from the caddy 42A (not shown in FIGS. 6A and 6B) partially through the first bracket 28A and into the rib 24A. The one or more fasteners 15 can mount the first bracket 28A against the rib 24A forming the assembly 12B of FIG. 4. Upon forming the assembly 12A, the delivery device 44A including the caddy 42A (now empty of the one or more fasteners 15) can be decoupled from the first bracket 28A and the driver device 44A and the caddy 42A can be removed from the thoracic cavity 26.

Figure 7A:
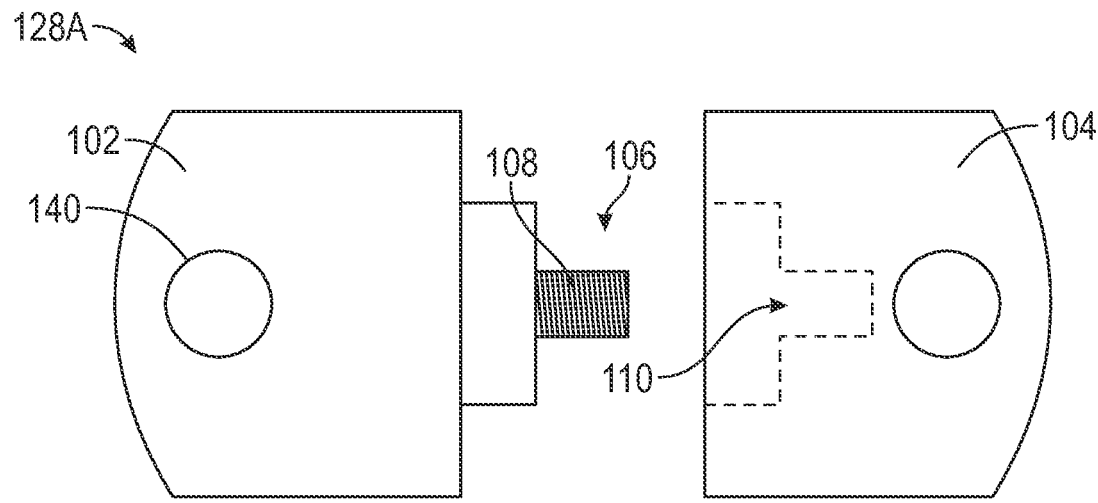
FIGS. 7A and 7B show yet another example prosthesis having a ratchet according to another example of the present application.
Figure 7B:
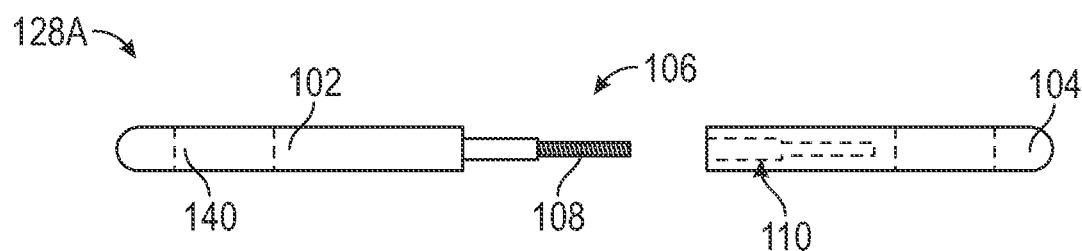

FIGS. 7A and 7B show a first bracket 128A according to a further example. The first bracket 128A can include a first portion 102 and a second portion 104. The first portion 102 and the second portion 104 can be separable from one another. The first portion 102 and the second portion 104 can each include at least one aperture 140 therethrough. The first portion 102 and the second portion 104 can be selectively joined by a ratchet 106. The ratchet 106 allows for compressive fixation to the rib or other bone. The ratchet 106 can include a male portion 108 and a mating female portion 110. The male portion 108 can be progressively inserted into the female portion 110 to facilitate increased compression. Retraction of the male portion 108 from the female portion 110 can reduce compression. Due to the ratchet 106, the elongate length of the bracket 128 can be adjustable.

Figure 8:
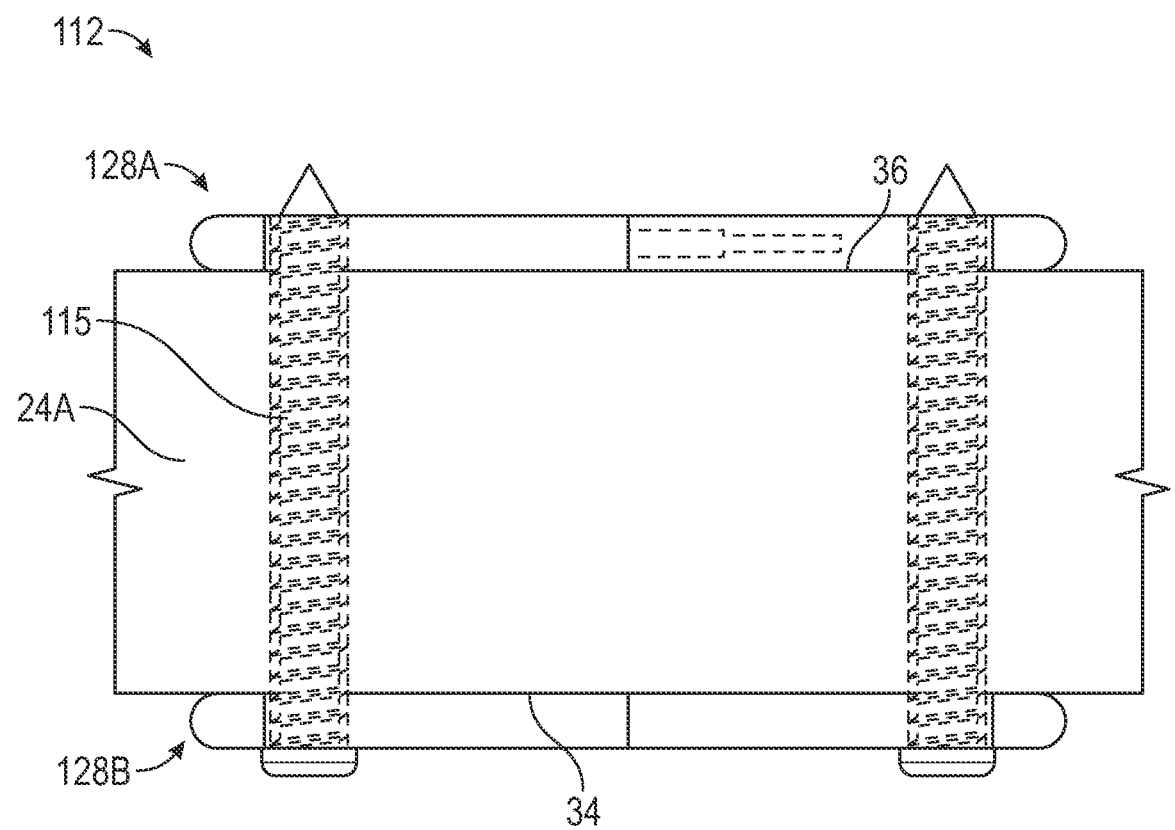
FIG. 8 shows an assembly of the prosthesis of FIGS. 7A and 7B with one or more fasteners and a second prosthesis to stabilize a bone according to another example of the present application.

FIG. 8 shows an assembly 112 of the first bracket 128A with a second bracket 128B joined by one or more fasteners 115. The second bracket 128B can be positioned on an opposing side of the rib 24A from the first bracket 128A. For example, the second bracket 128B can be on the first side 34 of the rib 24A as previously discussed and the first bracket 128A can be on the second side 36. The one or more fasteners 115 may be bone screws but can also be fixation posts according to some examples. The fixation posts can have a head coupled to the second bracket 128B. The head of the fixation posts can slide along slots (FIG. 9) of the second bracket 128B.

Figure 9:
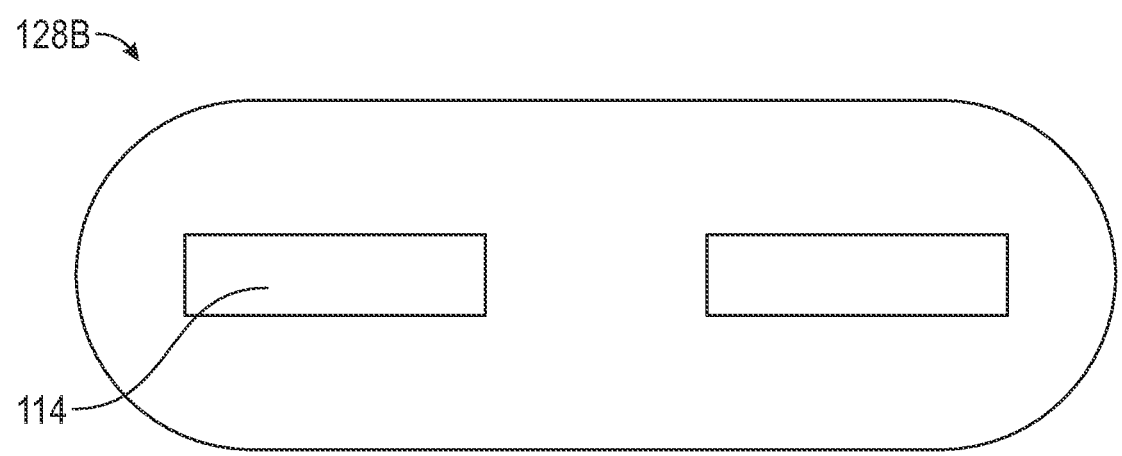
FIG. 9 shows an example of the second prosthesis of FIG. 8 according to another example of the present application.

FIG. 9 shows an example of the second bracket 128B, which can include one or more slots 114 configured to receive the one or more fasteners 115 and allow for movement of the one or more fasteners 115 (FIG. 8) along an elongate length of the second bracket 128B. This can allow for adjustment of the elongate length of the assembly 112 (FIG. 8), in particular, the first bracket 128A using the ratchet 106 (FIGS. 7A and 7B) as previously discussed.

In the foregoing detailed description, the methods, systems and apparatuses of the present disclosure have been described with reference to specific embodiments thereof. It will, however, be evident that various modifications and changes may be made thereto without departing from the broader spirit and scope of the present disclosure. The present specification and figures are accordingly to be regarded as illustrative rather than restrictive.

To further illustrate the apparatuses, systems and related methods disclosed herein, a non-limiting list of examples (referred to as aspects and techniques) is provided below.

Each of the following non-limiting examples can stand on its own, or can be combined in any permutation or combination with any one or more of the other examples. Elements of the aspects are purely optional and are not required in some examples.

In some aspects, the techniques described herein relate to a system for surgically repairing a rib of a patient, the system optionally including: a first rib bracket configured to be fixedly attached to a first side of the rib that faces a thoracic cavity of the patient; one or more fasteners configured to fixedly attach the first rib bracket to the rib; a driver having an end effector configured to drive the one or more fasteners into the rib; and a caddy configured to retain the one or more fasteners and deliver the one or more fasteners to a position adjacent the rib whereby the end effector is configured to engage the one or more fasteners to drive the one or more fasteners from the caddy and into the rib to fixedly attach the first rib bracket to the first side of the rib.

In some aspects, the techniques described herein relate to a system, further optionally including a delivery tool configured to couple with the first rib bracket and position the first rib bracket relative to the rib, wherein the first rib bracket is configured to pass through an incision in the patient in a first position and pass into the thoracic cavity, and wherein upon contacting the first side of the rib, the first rib bracket is configured to pivot relative to a shaft of the delivery tool within the thoracic cavity to a second position.

In some aspects, the techniques described herein relate to a system, wherein optionally the delivery tool is configured to couple with the caddy, wherein the caddy is configured to pass through the incision in the patient with the first rib bracket and pass into the thoracic cavity, wherein the caddy is configured to pivot with the first rib bracket relative to the shaft of the delivery tool within the thoracic cavity.

In some aspects, the techniques described herein relate to a system, wherein optionally the delivery tool is configured to engage a second side of the rib that opposes the first side of the rib while the first rib bracket is engaged with the first side of the rib to apply a clamp force on the rib.

In some aspects, the techniques described herein relate to a system, wherein optionally the end effector has a shaft coupling portion configured to couple with a shaft of the driver, and wherein a body of the end effector extends substantially laterally from a shaft coupling portion such that a head of the end effector is offset from a rotational axis of the shaft and the head of the end effector extends back in a proximal direction spaced from the shaft.

In some aspects, the techniques described herein relate to a system, wherein optionally the head has a rotational axis that is substantially aligned with but offset from the rotational axis of the shaft, and the head extends from the body back in a direction substantially parallel with and along the rotational axis of the shaft.

In some aspects, the techniques described herein relate to a system, wherein optionally the delivery tool is configured to couple with the caddy and is configured to translate the caddy to a position adjacent a second side of the rib that opposes the first side of the rib.

In some aspects, the techniques described herein relate to a system, further optionally including a second rib bracket configured to be fixedly attached to the second side of the rib, wherein the delivery tool is configured to engage the second rib bracket against the second side of the rib while the first rib bracket is engaged with the first side of the rib to apply a clamp force on the rib.

In some aspects, the techniques described herein relate to a system, wherein optionally at least the first rib bracket includes a first part and a second part, and wherein optionally the first rib bracket has a ratchet mechanism that connects the first part to the second part.

In some aspects, the techniques described herein relate to a system for surgically repairing a rib of a patient, the system optionally including: a first rib bracket configured to be fixedly attached to a first side of the rib that faces a thoracic cavity of the patient; one or more fasteners configured to fixedly attach the first rib bracket to the rib; a delivery tool configured to couple with the first rib bracket and position the first rib bracket relative to the rib within the thoracic cavity; and a caddy configured to retain the one or more fasteners and deliver the one or more fasteners to a position adjacent the rib and the first rib bracket.

In some aspects, the techniques described herein relate to a system, wherein optionally the first rib bracket, when mounted to the delivery tool, is configured to pass through an incision in the patient in a first position and pass into the thoracic cavity, and wherein upon contacting the first side of the rib, the first rib bracket is configured to pivot relative to a shaft of the delivery tool within the thoracic cavity to a second position.

In some aspects, the techniques described herein relate to a system, wherein optionally the delivery tool is configured to couple with the caddy, wherein the caddy is configured to pass through the incision in the patient with the first rib bracket and pass into the thoracic cavity, wherein the caddy is configured to pivot with the first rib bracket relative to the shaft of the delivery tool within the thoracic cavity.

In some aspects, the techniques described herein relate to a system, wherein optionally the delivery tool is configured to engage a second side of the rib that opposes the first side of the rib while the first rib bracket is engaged with the first side of the rib to apply a clamp force on the rib.

In some aspects, the techniques described herein relate to a system, wherein optionally the delivery tool is configured to couple with the caddy and is configured to translate the caddy to a position adjacent a second side of the rib that opposes the first side of the rib.

In some aspects, the techniques described herein relate to a system, further optionally including a second rib bracket configured to be fixedly attached by the one or more fasteners to the second side of the rib, wherein the delivery tool is configured to engage the second rib bracket against the second side of the rib while the first rib bracket is engaged with the first side of the rib to apply a clamp force on the rib.

In some aspects, the techniques described herein relate to a system, further optionally including a driver having an end effector configured to drive the one or more fasteners into the rib; and whereby the end effector is configured to engage the one or more fasteners to drive the one or more fasteners from the caddy and into the rib to fixedly attach the first rib bracket to the first side of the rib.

In some aspects, the techniques described herein relate to a system, optionally the end effector has a shaft coupling portion configured to couple with a shaft of the driver, wherein a body of the end effector extends substantially laterally from a shaft coupling portion such that a head of the end effector is offset from a rotational axis of the shaft, and wherein the head has a rotational axis that is substantially aligned with but offset from the rotational axis of the shaft, and the head extends from the body back in a direction substantially parallel with and along the rotational axis of the shaft.

In some aspects, the techniques described herein relate to a method of surgically repairing a rib of a patient optionally including: forming an incision adjacent the rib to access a thoracic cavity of the patient; inserting a first rib bracket into the thoracic cavity via the incision; positioning the first rib bracket to engage a first side of the rib that faces the thoracic cavity; and driving one or more fasteners through the bracket and into the rib to fixedly attach the first rib bracket to the rib.

In some aspects, the techniques described herein relate to a method, wherein optionally positioning the first rib bracket to engage the first side of the rib that faces the thoracic cavity includes rotating the first rib bracket from a position that allows passage of the first rib bracket through the incision to a second position to interface with the first side of the rib.

In some aspects, the techniques described herein relate to a method, further optionally including retaining the one or more fasteners with a caddy and positioning the caddy adjacent the first rib bracket.

In some aspects, the techniques described herein relate to a method, wherein optionally positioning the caddy adjacent the first rib bracket includes rotating the caddy with the first rib bracket from a position that allows passage of the caddy and first rib bracket through the incision to the second position where the first rib bracket interfaces with the first side of the rib.

In some aspects, the techniques described herein relate to a method, further optionally including engaging a second side of the rib that opposes the first side of the rib while the first rib bracket is engaged with the first side of the rib to apply a clamp force on the rib.

In some aspects, the techniques described herein relate to a method, wherein optionally the second side of the rib is engaged with a second rib bracket.

In some aspects, the techniques described herein relate to a method, wherein optionally driving one or more fasteners through the bracket and into the rib to fixedly attach the first rib bracket to the rib is performed with a driver head that accesses the thoracic cavity of the patient to engage the one or more fasteners.

In some aspects, the techniques described herein relate to a method, further optionally including ratcheting a first part of the first rib bracket to a second part of the second rib bracket to compress the rib.

What is claimed is:

1. A system for surgically repairing a rib of a patient, the system comprising:
    a first rib bracket configured to be fixedly attached to a first side of the rib that faces a thoracic cavity of the patient;
    one or more fasteners configured to fixedly attach the first rib bracket to the rib;
    a driver having an end effector configured to drive the one or more fasteners into the rib;
    a caddy configured to retain the one or more fasteners and deliver the one or more fasteners to a position adjacent the rib whereby the end effector is configured to engage the one or more fasteners to drive the one or more fasteners from the caddy and into the rib to fixedly attach the first rib bracket to the first side of the rib; and
    a delivery tool configured to couple with the first rib bracket and position the first rib bracket relative to the rib, wherein the first rib bracket is configured to pass through an incision in the patient in a first position and pass into the thoracic cavity, and wherein upon contacting the first side of the rib, the first rib bracket is configured to pivot relative to a shaft of the delivery tool within the thoracic cavity to a second position.

2. The system of claim 1, wherein the delivery tool is configured to couple with the caddy, wherein the caddy is configured to pass through the incision in the patient with the first rib bracket and pass into the thoracic cavity, wherein the caddy is configured to pivot with the first rib bracket relative to the shaft of the delivery tool within the thoracic cavity.

3. The system of claim 2, wherein the delivery tool is configured to engage a second side of the rib that opposes the first side of the rib while the first rib bracket is engaged with the first side of the rib to apply a clamp force on the rib.

4. The system of claim 1, wherein the delivery tool is configured to couple with the caddy and is configured to translate the caddy to a position adjacent a second side of the rib that opposes the first side of the rib.

5. The system of claim 4, further comprising a second rib bracket configured to be fixedly attached to the second side of the rib, wherein the delivery tool is configured to engage the second rib bracket against the second side of the rib while the first rib bracket is engaged with the first side of the rib to apply a clamp force on the rib.

6. The system of claim 1, wherein at least the first rib bracket comprises a first part and a second part, and wherein the first rib bracket has a ratchet mechanism that connects the first part to the second part.

7. A system for surgically repairing a rib of a patient, the system comprising:
    a first rib bracket configured to be fixedly attached to a first side of the rib that faces a thoracic cavity of the patient;
    one or more fasteners configured to fixedly attach the first rib bracket to the rib;
    a driver having an end effector configured to drive the one or more fasteners into the rib; and
    a caddy configured to retain the one or more fasteners and deliver the one or more fasteners to a position adjacent the rib whereby the end effector is configured to engage the one or more fasteners to drive the one or more fasteners from the caddy and into the rib to fixedly attach the first rib bracket to the first side of the rib,
    wherein the end effector has a shaft coupling portion configured to couple with a shaft of the driver, and wherein a body of the end effector extends substantially laterally from a shaft coupling portion such that a head of the end effector is offset from a rotational axis of the shaft and the head of the end effector extends back in a proximal direction spaced from the shaft.

8. The system of claim 7, wherein the head has a rotational axis that is substantially aligned with but offset from the rotational axis of the shaft, and the head extends from the body back in a direction substantially parallel with and along the rotational axis of the shaft.

9. A system for surgically repairing a rib of a patient, the system comprising:
    a first rib bracket configured to be fixedly attached to a first side of the rib that faces a thoracic cavity of the patient;
    one or more fasteners configured to fixedly attach the first rib bracket to the rib;
    a delivery tool configured to couple with the first rib bracket and position the first rib bracket relative to the rib within the thoracic cavity; and
    a caddy configured to retain the one or more fasteners and deliver the one or more fasteners to a position adjacent the rib and the first rib bracket;
    wherein the first rib bracket, when mounted to the delivery tool, is configured to pass through an incision in the patient in a first position and pass into the thoracic cavity, and wherein upon contacting the first side of the rib, the first rib bracket is configured to pivot relative to a shaft of the delivery tool within the thoracic cavity to a second position.

10. The system of claim 9, wherein the delivery tool is configured to couple with the caddy, wherein the caddy is configured to pass through the incision in the patient with the first rib bracket and pass into the thoracic cavity, wherein the caddy is configured to pivot with the first rib bracket relative to the shaft of the delivery tool within the thoracic cavity.

11. The system of claim 10, wherein the delivery tool is configured to engage a second side of the rib that opposes the first side of the rib while the first rib bracket is engaged with the first side of the rib to apply a clamp force on the rib.

12. The system of claim 9, wherein the delivery tool is configured to couple with the caddy and is configured to translate the caddy to a position adjacent a second side of the rib that opposes the first side of the rib.

13. The system of claim 12, further comprising a second rib bracket configured to be fixedly attached by the one or more fasteners to the second side of the rib, wherein the delivery tool is configured to engage the second rib bracket against the second side of the rib while the first rib bracket is engaged with the first side of the rib to apply a clamp force on the rib.

14. A system for surgically repairing a rib of a patient, the system comprising:
a first rib bracket configured to be fixedly attached to a first side of the rib that faces a thoracic cavity of the patient;
one or more fasteners configured to fixedly attach the first rib bracket to the rib;
a delivery tool configured to couple with the first rib bracket and position the first rib bracket relative to the rib within the thoracic cavity:
a caddy configured to retain the one or more fasteners and deliver the one or more fasteners to a position adjacent the rib and the first rib bracket; and
a driver having an end effector configured to drive the one or more fasteners into the rib; and
whereby the end effector is configured to engage the one or more fasteners to drive the one or more fasteners from the caddy and into the rib to fixedly attach the first rib bracket to the first side of the rib.

15. The system of claim 14, wherein the end effector has a shaft coupling portion configured to couple with a shaft of the driver, wherein a body of the end effector extends substantially laterally from a shaft coupling portion such that a head of the end effector is offset from a rotational axis of the shaft, and wherein the head has a rotational axis that is substantially aligned with but offset from the rotational axis of the shaft, and the head extends from the body back in a direction substantially parallel with and along the rotational axis of the shaft.

16. A method of surgically repairing a rib of a patient comprising:
forming an incision adjacent the rib to access a thoracic cavity of the patient;
inserting a first rib bracket into the thoracic cavity via the incision;
positioning the first rib bracket to engage a first side of the rib that faces the thoracic cavity; wherein positioning the first rib bracket to engage the first side of the rib that faces the thoracic cavity includes rotating the first rib bracket from a position that allows passage of the first rib bracket through the incision to a second position to interface with the first side of the rib;
driving one or more fasteners through the first rib bracket and into the rib to fixedly attach the first rib bracket to the rib; further comprising retaining the one or more fasteners with a caddy and positioning the caddy adjacent the first rib bracket, wherein positioning the caddy adjacent the first rib bracket includes rotating the caddy with the first rib bracket from a position that allows passage of the caddy and first rib bracket through the incision to the second position where the first rib bracket interfaces with the first side of the rib; and
engaging a second side of the rib that opposes the first side of the rib while the first rib bracket is engaged with the first side of the rib to apply a clamp force on the rib, wherein the second side of the rib is engaged with a second rib bracket.

* * * * *

UNITED STATES PATENT AND TRADEMARK OFFICE
CERTIFICATE OF CORRECTION

| | | |
|---|---|---|
| PATENT NO. | : 12,446,937 B2 | Page 1 of 1 |
| APPLICATION NO. | : 18/134957 | |
| DATED | : October 21, 2025 | |
| INVENTOR(S) | : Garcia et al. | |

It is certified that error appears in the above-identified patent and that said Letters Patent is hereby corrected as shown below:

In the Claims

In Column 13, Line 35, in Claim 14, delete "cavity:" and insert --cavity;-- therefor Signed and Sealed this
Second Day of December, 2025

John A. Squires
*Director of the United States Patent and Trademark Office*